US011333397B2

United States Patent
Kimura (10) Patent No.: US 11,333,397 B2
(45) Date of Patent: May 17, 2022

(54) HEAT TRANSFER FIN

(71) Applicant: RINNAI CORPORATION, Aichi (JP)

(72) Inventor: Ai Kimura, Aichi (JP)

(73) Assignee: RINNAI CORPORATION, Aichi (JP)

( * ) Notice: Subject to any disclaimer, the term of this patent is extended or adjusted under 35 U.S.C. 154(b) by 196 days.

(21) Appl. No.: 16/567,349

(22) Filed: Sep. 11, 2019

(65) Prior Publication Data

US 2020/0116389 A1 Apr. 16, 2020

(30) Foreign Application Priority Data

Oct. 15, 2018 (JP) .............................. JP2018-194605
Dec. 18, 2018 (JP) .............................. JP2018-236249

(51) Int. Cl.
| | |
|---|---|
| *F24H 1/14* | (2022.01) |
| *F28F 1/32* | (2006.01) |
| *F28F 1/42* | (2006.01) |
| *F28F 1/10* | (2006.01) |
| *F28F 1/12* | (2006.01) |
| *F24H 9/00* | (2022.01) |

(52) U.S. Cl.
CPC ............ *F24H 1/145* (2013.01); *F28F 1/325* (2013.01); *F24H 9/0005* (2013.01); *F28F 1/10* (2013.01); *F28F 1/12* (2013.01); *F28F 1/32* (2013.01); *F28F 1/42* (2013.01); *F28F 2240/00* (2013.01)

(58) Field of Classification Search
CPC .......... F24H 1/145; F24H 9/0005; F28F 1/32; F28F 1/325; F28F 1/42; F28F 2240/00; F28F 1/10; F28F 1/12

USPC ......................................................... 122/18.4
See application file for complete search history.

(56) References Cited

U.S. PATENT DOCUMENTS

| | | | |
|---|---|---|---|
| 7,578,339 B2 * | 8/2009 | Kaga .......................... | F28F 1/32 |
| | | | 165/109.1 |
| 9,638,476 B2 * | 5/2017 | Kerler ........................ | F28F 3/08 |
| 2012/0175101 A1 * | 7/2012 | Tamura .................. | F28D 1/0477 |
| | | | 165/181 |

FOREIGN PATENT DOCUMENTS

| | | | | |
|---|---|---|---|---|
| JP | 2018-66516 | | 4/2018 | |
| JP | 2018096622 A | * | 6/2018 | .............. B23P 15/26 |

* cited by examiner

*Primary Examiner* — Steven B McAllister
*Assistant Examiner* — Benjamin W Johnson
(74) *Attorney, Agent, or Firm* — Wenderoth, Lind & Ponack, L.L.P.

(57) ABSTRACT

A heat transfer fin (1) includes a plurality of heat-transfer-tube insertion holes (10) aligned in a single stage, a downstream cut portion (3) formed so as to be recessed toward an upstream side of a gas flow passage of combustion exhaust gas, a downstream flange (13) formed on a peripheral edge of the downstream cut portion (3) so as to protrude from one surface of the heat transfer fin (1), and a plurality of first protruding pieces (4*a*) (4*b*) (4*c*) formed between the heat-transfer-tube insertion hole (10) and the downstream flange (13) so as to protrude alternately from both surfaces of the heat transfer fin (1).

6 Claims, 7 Drawing Sheets

HEAT TRANSFER FIN

FIELD OF THE INVENTION

The present invention relates to a heat transfer fin for a heat exchanger.

DESCRIPTION OF THE RELATED ART

A fin-tube type heat exchanger for a combustion apparatus, such as a water heater and a heat source device for a room heater, includes a heat exchanger body through which combustion exhaust gas generated from a burner flows, a plurality of flat plate-shaped heat transfer fins disposed in a vertical posture and arranged side by side between side walls of the heat exchanger body, and a plurality of heat transfer tubes in which a heat medium such as water flows.

In the above conventional heat exchanger, the plurality of heat transfer tubes is inserted through the heat transfer fin in a staggered manner in two or more stages in a direction of a gas flow passage of the combustion exhaust gas. (For example, Japanese Unexamined Patent Publication No. 2018-66516 A) According to the heat exchanger having the plurality of heat transfer tubes arranged in the staggered manner in the plurality of stages, the combustion exhaust gas passing between adjacent heat transfer tubes in a lower stage flows toward a heat transfer tube in an upper stage. This allows heat in the combustion exhaust gas to efficiently transfer to the heat medium flowing in the heat transfer tubes.

In the above heat exchanger, the heat transfer tubes are connected in cascade connection to form a single heat exchange tube path. Specifically, a downstream tube end of the heat transfer tube communicates with an upstream tube end of an adjacent heat transfer tube in each stage. Further, at a side end of the heat transfer fin, a downstream tube end of a most downstream heat transfer tube in the lower stage communicates with an upstream tube end of a most upstream heat transfer tube in the upper stage. Thus, in a case where the heat transfer tubes are inserted through each of the heat transfer fins in the plurality of stages, the heat medium flows into the heat exchanger from an upstream tube end of an most upstream heat transfer tube in the lower stage at one side end of the heat transfer fin, flows toward the downstream tube end of the most downstream heat transfer tube in the lower stage at the other side end of the heat transfer fin, and then flows to the upstream tube end of the most upstream heat transfer tube in the upper stage at the other side end of the heat transfer fin. Then, a flow path direction of the heat medium is folded back in an opposite direction at the other side end of the heat transfer fin, and the heat medium flows toward a downstream tube end of a most downstream heat transfer tube in the upper stage at the one side end of the heat transfer fin. This results in longer contact time between the combustion exhaust gas and the heat transfer tubes.

On the other hand, a combustion apparatus having a burner unit with a plurality of burners divided into a plurality of combustion regions has been proposed in order to make a combustion amount more adjustable. According to this combustion apparatus, the number of burners to burn can be switched in a plurality of phases in response to increase or decrease in a required combustion amount. Therefore, when the required combustion amount is small, only the burners disposed in some of the plurality of combustion regions burn.

The above-described partial combustion results in concentrated heating of only the heat transfer tubes located downstream of the combustion region of the burning burners. For example, when only the burners in the combustion region located upstream of one side end of the heat transfer fin burn, high temperature combustion exhaust gas mainly flows toward the heat transfer tubes located at the one side end the same as that combustion region. However, the combustion air supplied to the burner unit flows also to the non-burning burners located upstream of the other side end of the heat transfer fin. The low temperature combustion air passing through the non-burning burners mainly flows toward the heat transfer tubes located at the other side end of the heat transfer fin the same as the combustion region of the non-burning burners. Therefore, the heat transfer tubes near the one side end of the heat transfer fin are heated by the combustion exhaust gas, while the heat transfer tubes near the other side end of the heat transfer fin are cooled by the combustion air. This forms, in each of the plurality of stages, a high temperature region and a low temperature region. Thus, in a case where the heat transfer tubes are arranged in the plurality of stages in the direction of the gas flow passage of the combustion exhaust gas, the heat medium heated by the combustion exhaust gas is cooled in each stage by the combustion air that is not used for combustion. There is consequently a problem that repeated temperature rise and fall of the heat medium within the heat exchange tube path causes inefficient heating of the heat medium.

SUMMARY OF INVENTION

The present invention has been made to solve the above problem, and an object of the present invention is to provide a heat transfer fin for a heat exchanger capable of efficiently transferring heat in combustion exhaust gas to a heat medium flowing in a heat transfer tube.

According to the present invention, there is provided a heat transfer fin in a flat plate shape arranged in a heat exchanger through which combustion exhaust gas flows, the heat transfer fin comprising:

a plurality of heat-transfer-tube insertion holes aligned in a single stage;

a downstream cut portion provided downstream of a gas flow passage of the combustion exhaust gas between adjacent heat-transfer-tube insertion holes, and formed so as to be recessed toward an upstream side of the gas flow passage of the combustion exhaust gas;

a downstream flange formed on a peripheral edge of the downstream cut portion so as to protrude from one surface of the heat transfer fin; and a plurality of first protruding pieces formed between the heat-transfer-tube insertion hole and the downstream flange so as to protrude alternately from both surfaces of the heat transfer fin.

Other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

Hereinafter, referring to drawings, a heat transfer fin and a combustion apparatus according to an embodiment of the present invention will be described in detail.

Figure 1:
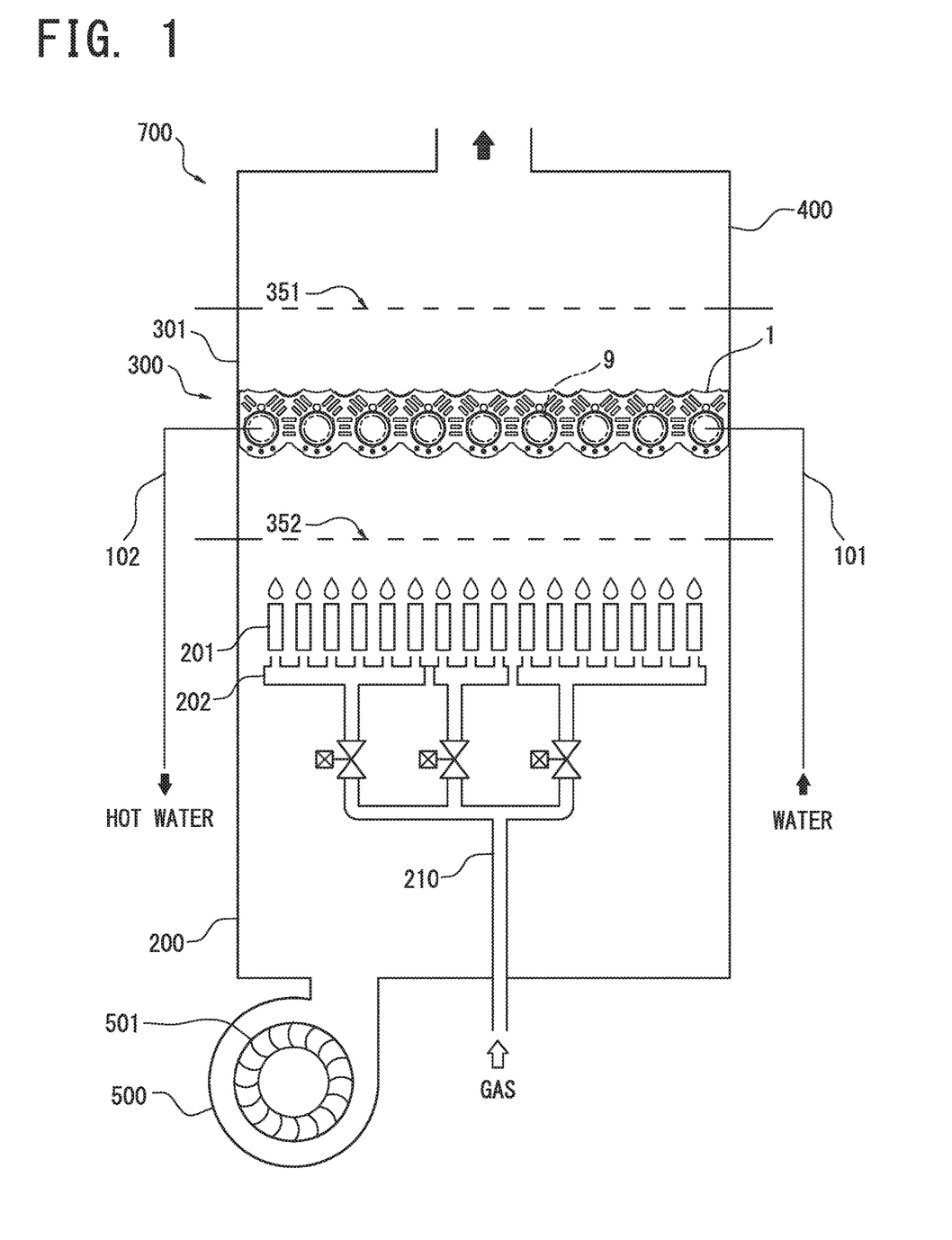
FIG. 1 is a schematic vertical cross-sectional view showing one example of a combustion apparatus according to an embodiment of the present invention.
Figure 2:
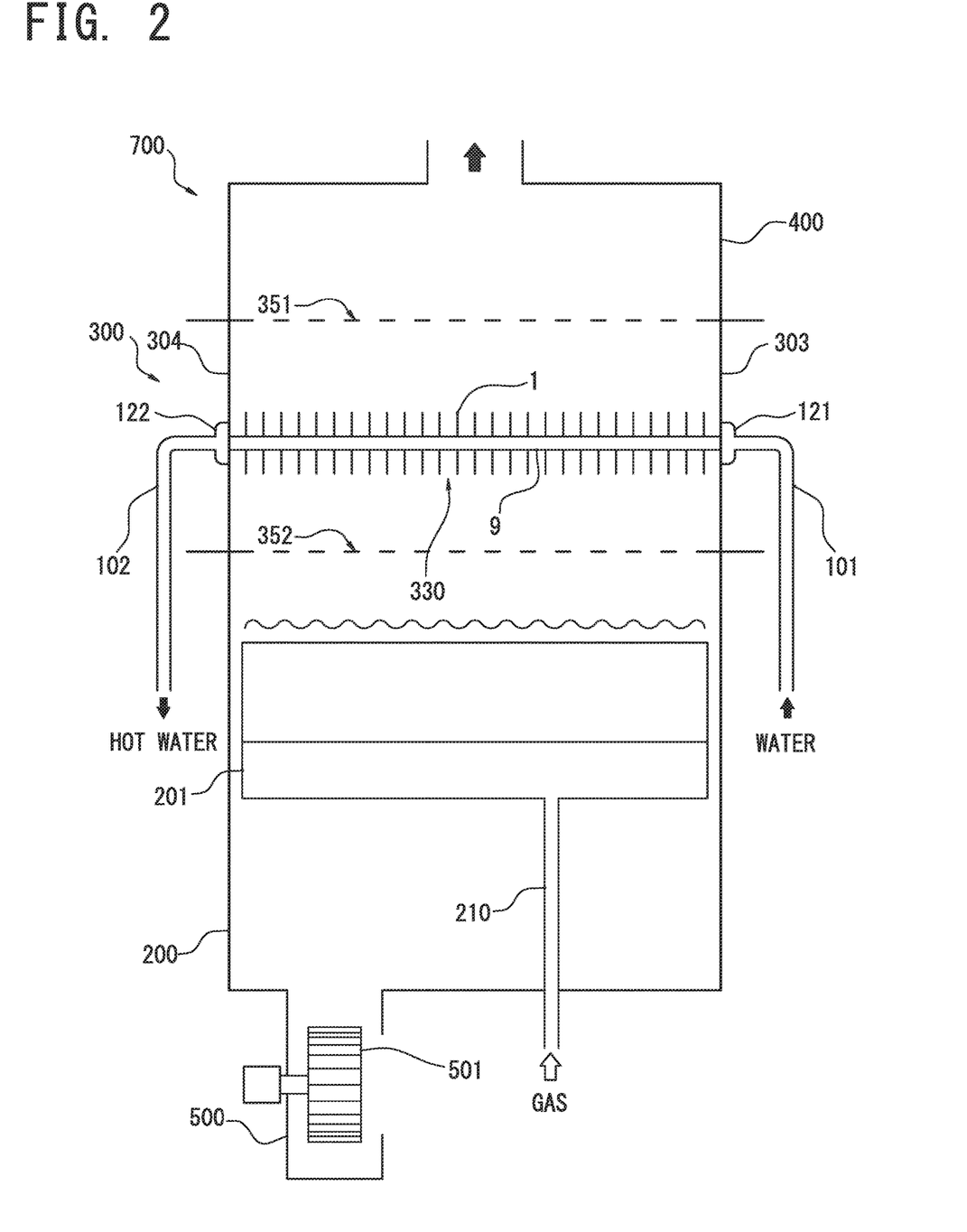
FIG. 2 is a schematic side view showing one example of the combustion apparatus according to the embodiment of the present invention.

FIG. 1 is a schematic vertical cross-sectional view of the combustion apparatus applied to a water heater, and FIG. 2 is a schematic side view thereof. As shown in FIGS. 1 and 2, a heat exchanger 300 provided with a heat transfer fin 1 according to the embodiment of the present invention is incorporated in a combustion apparatus 700. The heat exchanger 300 is configured such that water (a heat medium) supplied from a water supply pipe 101 to a heat transfer tube 9 is heated by heat exchange with combustion exhaust gas released from a gas burner 201 and supplied to a hot-water supplying terminal (not-shown) via a hot-water supply pipe 102.

A body (heat exchanger body) 301 constituting an outer shell of the heat exchanger 300 is formed in a substantially rectangular box shape having an upper opening 351 and a lower opening 352 on upper and lower sides, respectively. The lower opening 352 is connected to a burner unit 200 containing the gas burner 201. On the other hand, the upper opening 351 is connected to an exhaust gas chamber 400 leading the combustion exhaust gas fed from the gas burner 201 to the body 301 out the combustion apparatus 700.

In the present specification, when one main surface of the heat transfer fin 1 is viewed from a front surface side (a front side of FIG. 1 and a right side of FIG. 2), a thickness direction of the heat transfer fin 1 corresponds to a front-rear direction, a width direction of the heat transfer fin 1 corresponds to a left-right direction, and a height direction of the heat transfer fin 1 corresponds to an up-down direction. Also, the front surface side of the heat transfer fin 1 corresponds to one surface side thereof, and a rear surface side corresponds to the other surface side. Further, following a gas flow passage of the combustion exhaust gas, a lower side corresponds to an upstream side, and an upper side corresponds to a downstream side.

The burner unit 200 is divided into a plurality of combustion regions (in this embodiment, three). In each of the combustion regions, one or more flat gas burners 201 are provided in a vertical posture and arranged side by side in the left-right direction. The respective gas burners 201 communicate with divided gas manifolds 202 corresponding to the combustion regions. Each of the gas manifolds 202 connects to a branch gas pipe branched from a gas pipe 210. Therefore, in partial combustion, only the gas burners 201 in some of the combustion regions are supplied with fuel gas and combustion air, and the gas burners 201 in the other of the combustion regions are supplied only with the combustion air.

A fan unit 500 is connected to a lower portion of the burner unit 200. Air outside the combustion apparatus 700 is fed as the combustion air of the gas burner 201 into the burner unit 200 by rotating a fan 501 in the fan unit 500. The air fed into the burner unit 200 is introduced into the body 301 of the heat exchanger 300 from the lower opening 352 together with the combustion exhaust gas released from the gas burners 201, and then discharged to an outside of the combustion apparatus 700 from the upper opening 351 through the exhaust gas chamber 400.

The body 301 has a front side wall 303 and a rear side wall 304 facing each other. Between the front side wall 303 and the rear side wall 304, a plurality of flat plate-shaped heat transfer fins 1 made of copper-based metal is arranged substantially in parallel in the front-rear direction with a predetermined clearance. Also, between the front side wall 303 and the rear side wall 304 facing each other in the body 301, a plurality of straight heat transfer tubes 9 (in this embodiment, nine) made of copper-based metal extends.

The heat transfer tubes 9 are arranged side by side in the left-right direction at predetermined intervals between the front side wall 303 and the rear side wall 304 similar to the gas burners 201. Each of the heat transfer tubes 9 has a substantially circular cross-sectional shape. Although not shown, both tube ends of the heat transfer tubes 9 protrude outward from tube-end insertion holes provided in the front side wall 303 and the rear side wall 304. Except for an upstream tube end on a front wall side of a most upstream heat transfer tube 9 and a downstream tube end on a rear wall side of a most downstream heat transfer tube 9, tube ends of adjacent two heat transfer tubes 9 are serially connected to each other via connecting headers 121 and 122 outside the front side wall 303 and the rear side wall 304, thereby constituting one heat exchange tube path 330.

The water supply pipe 101 is connected to the connecting header 121 on an inlet side of the heat exchange tube path 330, while the hot-water supply pipe 102 is connected to the connecting header 122 on an outlet side of the heat exchange tube path 330. Therefore, the water supplied to the connecting header 121 at the inlet side through the water supply pipe 101 flows while meandering in the front-rear direction via the connecting headers 121 and 122 provided on the front side wall 303 and the rear side wall 304, and then flows from the connecting header 122 at the outlet side to the hot-water supply pipe 102.

Figure 3:
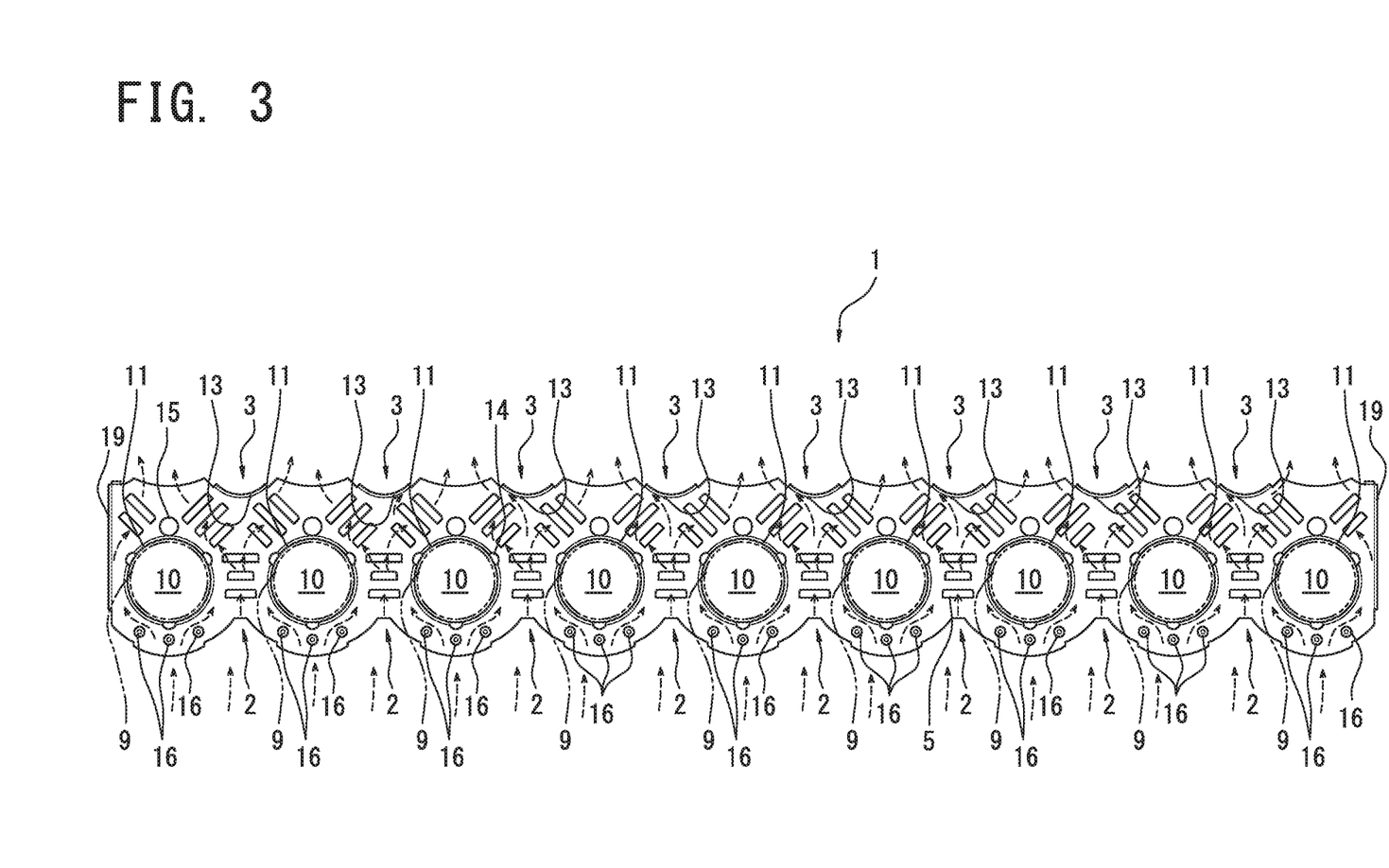
FIG. 3 is a schematic front view showing one example of a heat transfer fin according to the embodiment of the present invention.
Figure 4:
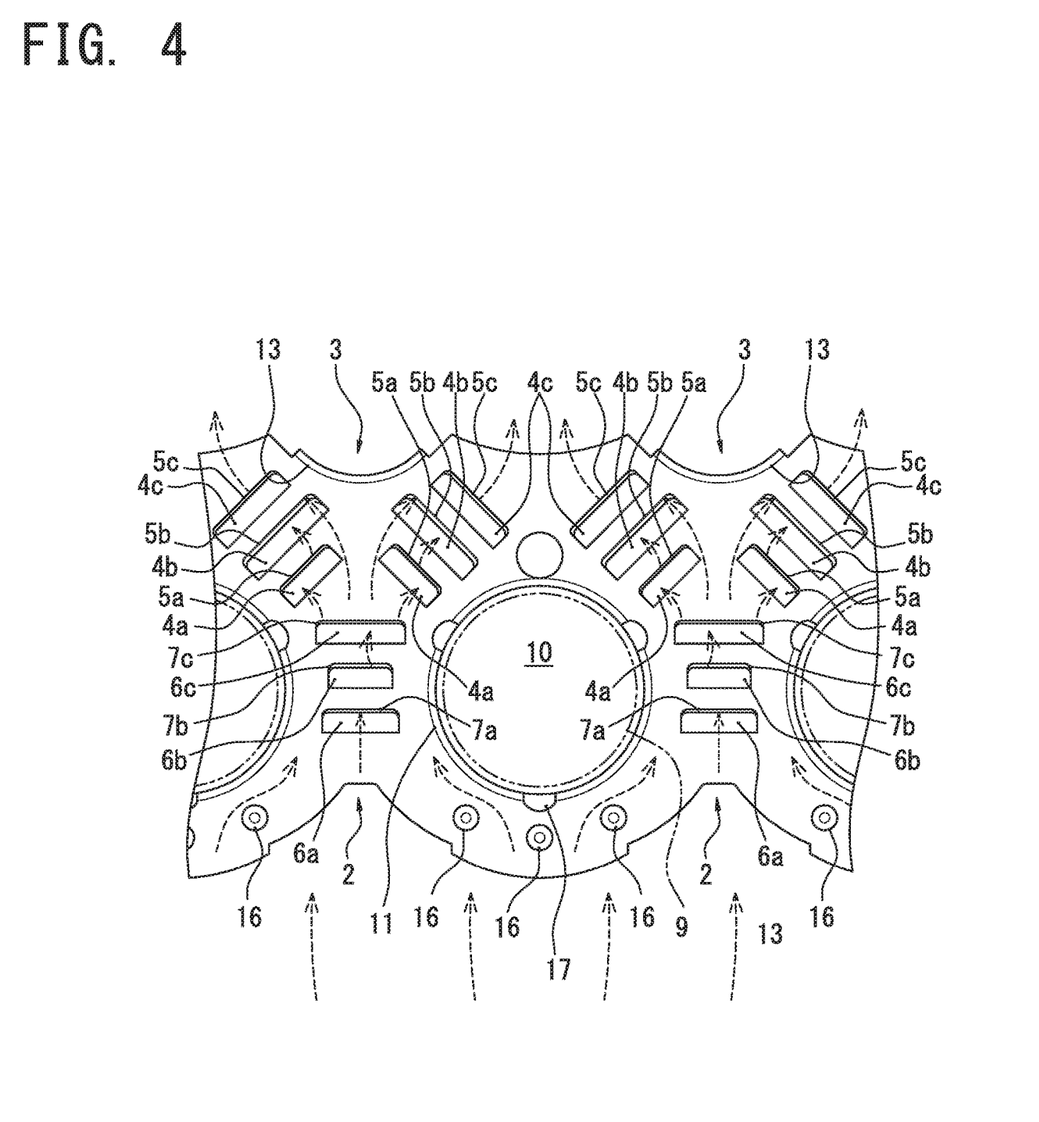
FIG. 4 is a schematic enlarged front view of a principal portion showing one example of the heat transfer fin according to the embodiment of the present invention.
Figure 5:
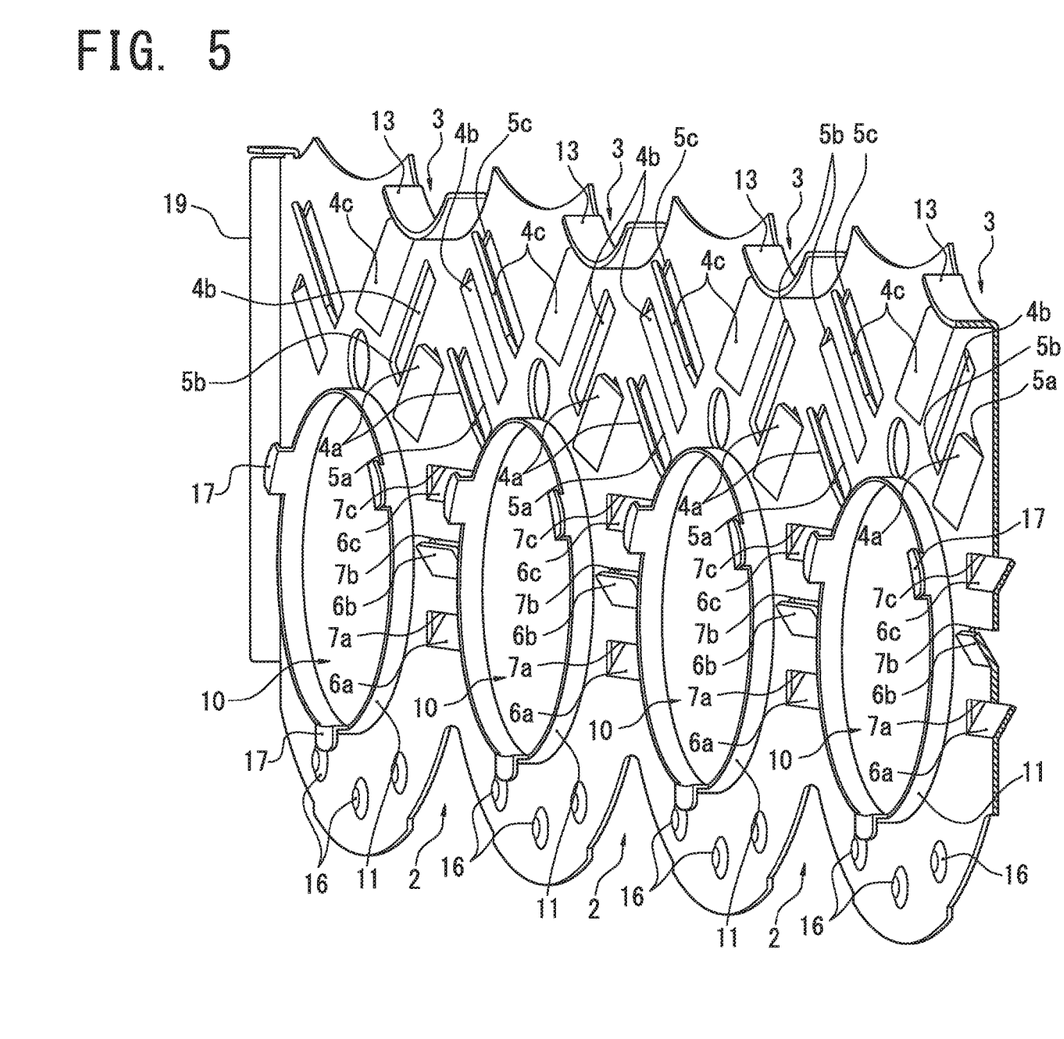
FIG. 5 is a schematic perspective view of a principal portion showing one example of the heat transfer fin according to the embodiment of the present invention.

As shown in FIGS. 3 to 5, each of the heat transfer fins 1 has a plurality of heat-transfer-tube insertion holes 10 (in this embodiment, nine) formed by burring at predetermined intervals for inserting the heat transfer tubes 9. Therefore, the heat-transfer-tube insertion holes 10 are laterally aligned in a single stage in the left-right direction of the heat transfer fin 1.

Each of the heat-transfer-tube insertion holes 10 has a circular shape substantially same as an outer shape of the heat transfer tube 9. A support flange 11 is also formed by burring to protrude forward from substantially the entire circumference of an inner peripheral edge of each of the heat-transfer-tube insertion holes 10. The support flange 11 has a predetermined protrusion height Hf (for example, 1.2 mm). The respective heat transfer tubes 9 are inserted through heat-transfer-tube insertion holes 10 in a direction substantially orthogonal to the heat transfer fins 1. The respective heat transfer tubes 9 are fixed to each of the heat transfer fins 1 by brazing outer circumferential surfaces of the heat transfer tubes 9 and inner circumferential surfaces of the support flange 11. Brazing material holding portions 15 are formed at upper circumferential edges of the respective heat-transfer-tube insertion holes 10.

A plurality of spacer portions 17 (in this embodiment, three) is formed in a circumferential direction of the support flange 11 at predetermined intervals to extend forward from the support flange 11 with their front ends bent radially outward. A protrusion height Hs of the spacer portion 17 is thus set higher than the protrusion height Hf of the support flange 11 (see FIG. 6). When the heat transfer fins 1 are arranged side by side in the front-rear direction, the spacer portions 17 abut on a rear surface of an adjacent heat transfer fin 1 to maintain the predetermined clearance between adjacent two heat transfer fins 1.

A plurality of upstream cut portions 2 (in this embodiment, eight) is formed in a fin lower end portion as an upstream end portion of the heat transfer fin 1. Each of the upstream cut portions 2 is provided upstream of a gap between adjacent heat-transfer-tube insertion holes 10. The upstream cut portions 2 are formed at the same pitch as that of the heat-transfer-tube insertion holes 10. Each of the upstream cut portions 2 is formed in a substantially reverse V-shape recessed toward the downstream side. Further, the upstream cut portion 2 has no forward protruding flange on its peripheral edge different from a downstream cut portion 3 described later. Therefore, the combustion exhaust gas flowing from the upstream side smoothly flows into the clearance between the adjacent heat transfer fins 1.

Each of the upstream cut portions 2 is formed by cutting out the heat transfer fin 1 from the fin lower end portion to a height substantially equal to a height of a lower end of the heat-transfer-tube insertion hole 10. Accordingly, a part of the combustion exhaust gas introduced into the body 301 from the lower opening 352 passes through the upstream cut portions 2 and reaches the gap between the adjacent heat-transfer-tube insertion holes 10. The upstream cut portions 2 thus make a distance between the heat-transfer-tube insertion hole 10 and an upstream edge of the heat transfer fin 1 substantially uniform in an upstream region of the heat transfer fin 1. Therefore, heat in the combustion exhaust gas uniformly transfers to the heat transfer fins 1 in the upstream regions of the heat transfer fins 1. This can achieve a lower temperature of the upstream edges of the heat transfer fins 1 to keep the heat transfer fins 1 from partially having high temperatures, and thus improvement of durability of the heat transfer fins 1.

A plurality of downstream cut portions 3 (in this embodiment, eight) is formed in a fin upper end portion as a downstream end portion of the heat transfer fin 1. Each of the downstream cut portions 3 is provided downstream of the gap between the adjacent heat-transfer-tube insertion holes 10. The downstream cut portions 3 are formed at the same pitch as that of the heat-transfer-tube insertion holes 10. The downstream cut portions 3 may be formed in a substantially arc shape recessed toward the upstream side. Each of the downstream cut portions 3 is formed by cutting out the heat transfer fin 1 from the upper end portion to a height above an upper end of the heat-transfer-tube insertion hole 10. The downstream cut portions 3 may be formed in a substantially V-shape.

A downstream flange 13 is formed to protrude forward from a peripheral edge of each of the downstream cut portions 3. The downstream flange 13 has a predetermined protrusion height Hk (for example, 1.9 mm). The protrusion height Hk of the downstream flange 13 is set slightly lower than the clearance distance between the adjacent heat transfer fins 1. A width in the left-right direction of the downstream cut portion 3 is set substantially equal to a minimum distance between the adjacent heat-transfer-tube insertion holes 10. The downstream flange 13 thus protrudes forward so as to substantially close a part of upper opening portion of the clearance between the adjacent heat transfer fins 1. This causes the combustion exhaust gas flowing from the upstream side to flow to the downstream side while spreading in the left-right direction along the substantially arc-shaped downstream flanges 13. Preferably, the protrusion height Hk of the downstream flange 13 is set in such a manner that a clearance between a front end of the downstream flange 13 and the rear surface of the adjacent heat transfer fin 1 becomes narrower.

Since the heat transfer tubes 9 are inserted into the heat-transfer-tube insertion holes 10, the combustion exhaust gas is split into left and right components by the heat transfer tubes 9. The split combustion exhaust gas flows between the heat-transfer-tube insertion hole 10 and the downstream flange 13 to the downstream side. Therefore, as indicated by dashed arrows in the figures, the gas flow passage of the combustion exhaust gas is formed to wrap around the heat transfer tubes 9 in a downstream region of the heat transfer fin 1. This can achieve not only reduction in combustion exhaust gas flowing by a shortcut from the gap between the adjacent heat transfer tubes 9 to the downstream side, but also longer contact time of the combustion exhaust gas with the heat transfer tubes 9.

On fin left and right end portions of the heat transfer fin 1, side wall portions 19 bent forward are formed. Each of the side wall portions 19 thus protrudes forward so as to substantially close right and left opening portions of the clearance between the adjacent heat transfer fins 1. This reduces an amount of the combustion exhaust gas flowing through the clearance between the adjacent heat transfer fins 1 and leaking from the fin left and right end portions.

Between the heat-transfer-tube insertion hole 10 and the downstream flange 13, a plurality of first cut-and-raised portions 4a, 4b, 4c (in this embodiment, three) formed by cutting and raising parts of the heat transfer fin 1 is aligned in a direction of the gas flow passage of the combustion exhaust gas at predetermined intervals as first protruding pieces. Each of the first cut-and-raised portions 4a, 4b, 4c is formed in a substantially rectangular fin shape with its short side extending along the direction of the gas flow passage of the combustion exhaust gas. Further, each of the first cut-and-raised portions 4a, 4b, 4c is cut and raised from the downstream side toward the upstream side in such a manner that its tip end is located at the downstream side. In other words, each of the protruding pieces (first cut-and-raised portions) protrudes only in a downstream direction of the gas flow passage of the combustion exhaust gas. This forms first slits 5a, 5b, 5c in a substantially rectangular shape on the downstream side of the first cut-and-raised portions 4a, 4b, 4c, respectively.

The first cut-and-raised portions 4a, 4b, 4c incline at a constant angle (in this embodiment, about 45 degrees) with respect to the left-right direction in such a manner that their end portions at a heat-transfer-tube insertion hole side are located at the upstream side between the heat-transfer-tube insertion hole 10 and the downstream flange 13. Therefore, the first cut-and-raised portions 4a, 4b, 4c are cut and raised so as to be substantially orthogonal to the gas flow passage of the combustion exhaust gas flowing between the heat-transfer-tube insertion hole 10 and the downstream flange 13. This allows the heat in the combustion exhaust gas to directly transfer to the first cut-and-raised portions 4a, 4b, 4c in the downstream region of the heat transfer fin 1. Furthermore, collision of the combustion exhaust gas with the first cut-and-raised portions 4a, 4b, 4c promotes turbulent flow of the combustion exhaust gas. When the combustion exhaust gas colliding with the first cut-and-raised portions 4a, 4b, 4c passes downstream ends of the first cut-and-raised portions 4a, 4b, 4c, eddy flow is formed. This eddy flow also promotes the turbulent flow of the combustion exhaust gas. This can achieve a breakup of a temperature boundary layer of the combustion exhaust gas flowing on the heat transfer fin 1 in the downstream region of the heat transfer fin 1. Therefore, the heat in the combustion exhaust gas efficiently transfers to the heat transfer fins 1.

As shown in FIG. 5, among the three first cut-and-raised portions 4a, 4b, 4c, the most upstream and the most downstream first cut-and-raised portions 4a and 4c are cut and raised forward from the heat transfer fin 1, and the intermediate first cut-and-raised portion 4b is cut and raised rearward. That is, the first cut-and-raised portions 4a, 4b, 4c are formed so as to protrude alternately from both the front and rear surfaces of the heat transfer fin 1. Accordingly, a part of the combustion exhaust gas flowing between the heat-transfer-tube insertion hole 10 and the downstream flange 13 flows from the upstream side to the downstream side while meandering on both the front and rear surface sides of the heat transfer fin 1 via the first slits 5a, 5b, 5c opening on the downstream sides of the first cut-and-raised portions 4a, 4b, 4c. Thus, repeated mixing and separation of the combustion exhaust gas flowing through the clearance between the adjacent heat transfer fins 1 promotes the turbulent flow of the combustion exhaust gas. Additionally, when the combustion exhaust gas passes through the first slits 5a, 5b, 5c, collision of the combustion exhaust gas with opening edges of the first slits 5a, 5b, 5c further promotes the turbulent flow of the combustion exhaust gas. This can achieve the breakup of the temperature boundary layer of the combustion exhaust gas flowing on the heat transfer fin 1 in the downstream region of the heat transfer fin 1.

Between the adjacent heat-transfer-tube insertion holes 10, a plurality of second cut-and-raised portions 6a, 6b, 6c (in this embodiment, three) formed by cutting and raising parts of the heat transfer fin 1 is aligned in the direction of the gas flow passage of the combustion exhaust gas at predetermined intervals as second protruding pieces. Each of the second cut-and-raised portions 6a, 6b, 6c has a protruding shape similar to the first cut-and-raised portions 4a, 4b, 4c except that those are formed substantially horizontally in the up-down direction. Therefore, the second cut-and-raised portions 6a, 6b, 6c are cut and raised so as to be substantially orthogonal to the gas flow passage of the combustion exhaust gas flowing between the adjacent heat-transfer-tube insertion holes 10. This allows the heat in the combustion exhaust gas to directly transfer to the second cut-and-raised portions 6a, 6b, 6c in an intermediate region of the heat transfer fin 1. Further, the turbulent flow of the combustion exhaust gas is promoted by the second cut-and-raised portions 6a, 6b, 6c and second slits 7a, 7b, 7c, so that a breakup of a temperature boundary layer of the combustion exhaust gas flowing on the heat transfer fins 1 in the intermediate region can be achieved. Therefore, the heat in the combustion exhaust gas efficiently transfers to the heat transfer fins 1.

Among the three second cut-and-raised portions 6a, 6b, 6c, the most upstream second cut-and-raised portion 6a is located above the lower end of the heat-transfer-tube insertion hole 10, and the most downstream second cut-and-raised portion 6c is located below the upper end of the heat-transfer-tube insertion hole 10. Further, the second cut-and-raised portions 6a, 6b, 6c are formed wider as they are farther away in the direction of the gas flow passage of the combustion exhaust gas from a center line connecting the centers of the adjacent heat-transfer-tube insertion holes 10. Thus, distances between left and right side ends of the second cut-and-raised portions 6a, 6b, 6c and the heat-transfer-tube insertion hole 10 are substantially equal. This forms gaps of a substantially equal distance between the second cut-and-raised portions 6a, 6b, 6c and the heat-transfer-tube insertion hole 10. The first cut-and-raised portions 4a, 4b, 4c and the second cut-and-raised portions 6a, 6b, 6c are formed as a whole so as to protrude alternately from both the front and rear surfaces of the heat transfer fin 1.

Figure 6:
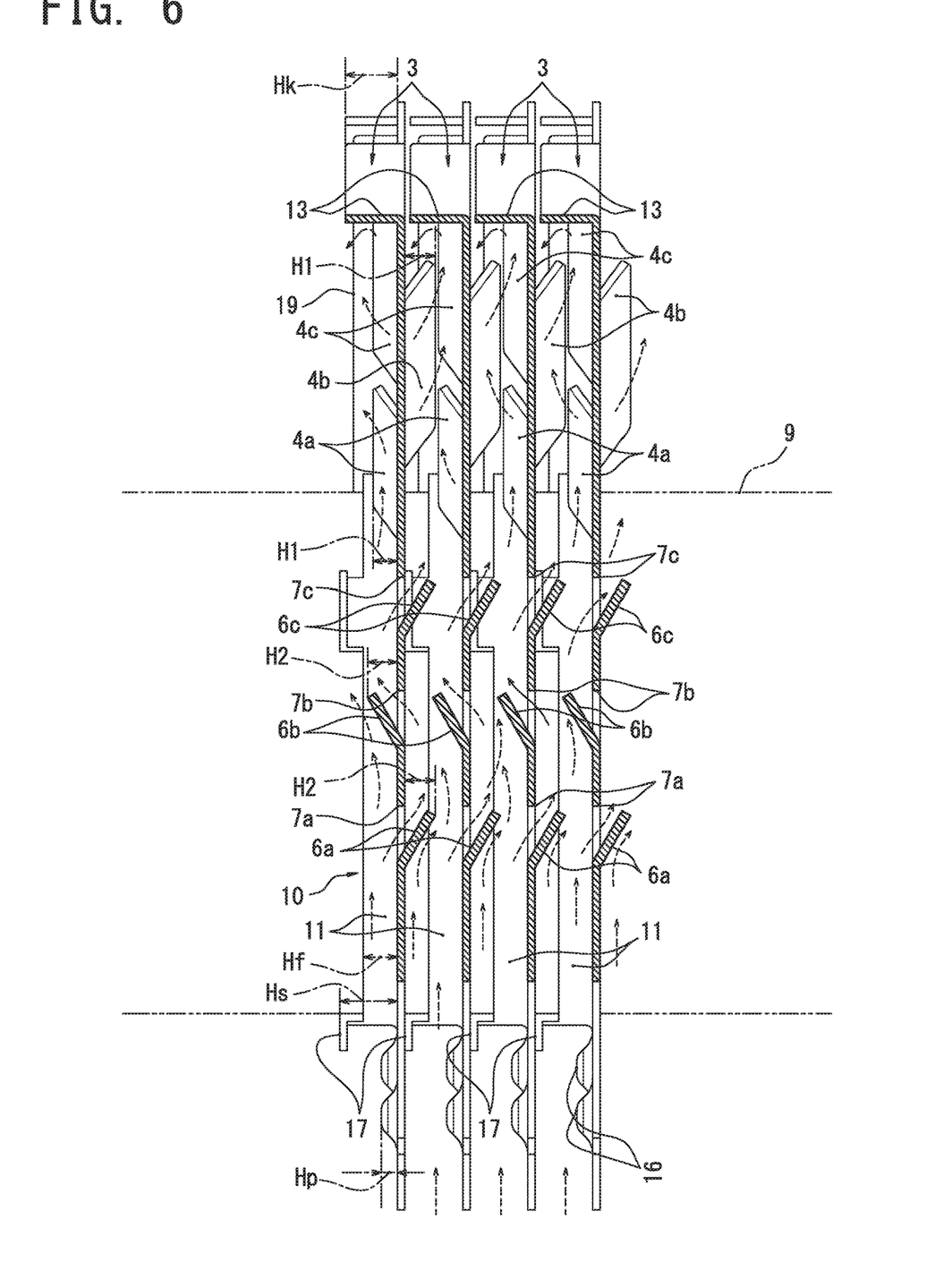
FIG. 6 is a schematic cross-sectional view showing one example of the heat transfer fin according to the embodiment of the present invention.

As shown in FIG. 6, a protrusion height H1 of the first cut-and-raised portions 4a, 4b, 4c and a protrusion height H2 of the second cut-and-raised portions 6a, 6b, 6c are both set lower than the protrusion height Hk of the downstream flange 13. This can suppress excessive increase in passing resistance occurred when the combustion exhaust gas passes through the clearance between the adjacent heat transfer fins 1.

Between the heat-transfer-tube insertion hole 10 and the lower edge (upstream edge) of the heat transfer fin 1, a plurality of upstream protrusions 16 (in this embodiment, three) is formed in the left-right direction at predetermined intervals to protrude forward. Each of the upstream protrusions 16 is formed in a substantially truncated cone shape without penetrating the heat transfer fin 1. When high temperature combustion exhaust gas flowing from the upstream side flows into the clearance between the adjacent heat transfer fins 1, it collides with the upstream protrusions 16. This allows split combustion exhaust gas to form in the upstream region of the heat transfer fin 1, and promotes turbulent flow of the combustion exhaust gas. Also, increased surface areas of the heat transfer fins 1 due to the upstream protrusions 16 can achieve longer contact time of the combustion exhaust gas with the heat transfer fins 1 in the upstream region of the heat transfer fin 1. The number and shape of the upstream protrusions 16 may appropriately be set in accordance with the shape and size of the heat-transfer-tube insertion hole 10. The upstream protrusions 16 may be shaped to be elongate in the left-right direction, for example.

A protrusion height Hp of each of the upstream protrusions 16 protruding forward is set lower than the protrusion height Hf of the support flange 11. Therefore, the combustion exhaust gas is not hindered to come into contact with the support flange 11 and the heat transfer tubes 9 located downstream of the upstream protrusions 16.

In the combustion apparatus of the above embodiment, the plurality of heat transfer tubes 9 is inserted through the plurality of heat-transfer-tube insertion holes 10 of each heat transfer fin 1 in the direction substantially orthogonal to the respective heat transfer fins 1. Additionally, the heat transfer tubes 9 are connected so as to form the single heat exchange tube path 330 in the heat exchanger 300. Further, the burner unit 200 is divided into the plurality of combustion regions, and the flat gas burners 201 are arranged side by side in the same direction as an alignment direction of the plurality of heat transfer tubes 9. Thus, partial combustion causes only some of the heat transfer tubes 9 in the heat exchanger 300 to be heated to high temperatures. However, according to the heat exchanger 300 having the heat transfer fins 1 of the present embodiment, since the heat transfer tubes 9 are aligned in the single stage in the heat exchanger 300, no folded back portion in the left-right direction is formed in the heat exchange tube path 330. Thus, even in a case where the partial combustion in the burner unit 200 having the plurality of combustion regions is performed in such a manner that only the gas burners 201 in some of the combustion regions burn, repeated temperature rise and fall of the heat medium flowing in the heat exchange tube path 330 can be avoided by burning the gas burners 201 in the combustion region located upstream of the heat transfer tube 9 at the outlet side.

Furthermore, according to the present embodiment, even in a case where the heat transfer fins 1 having the plurality of heat-transfer-tube insertion holes 10 aligned in the single stage are used, the longer contact time of the combustion exhaust gas with the heat transfer tubes 9 and the breakup of the temperature boundary layer of the combustion exhaust gas flowing on the heat transfer fins 1 can be achieved. Thus, the heat in the combustion exhaust gas can be well transferred to the heat transfer tubes 9 inserted through the heat-transfer-tube insertion holes 10, and to the heat transfer fins 1. Therefore, there is provided the combustion apparatus which is capable of efficiently heating the heat medium flowing in the heat transfer tubes 9 by heat exchange with the combustion exhaust gas.

Figure 7:
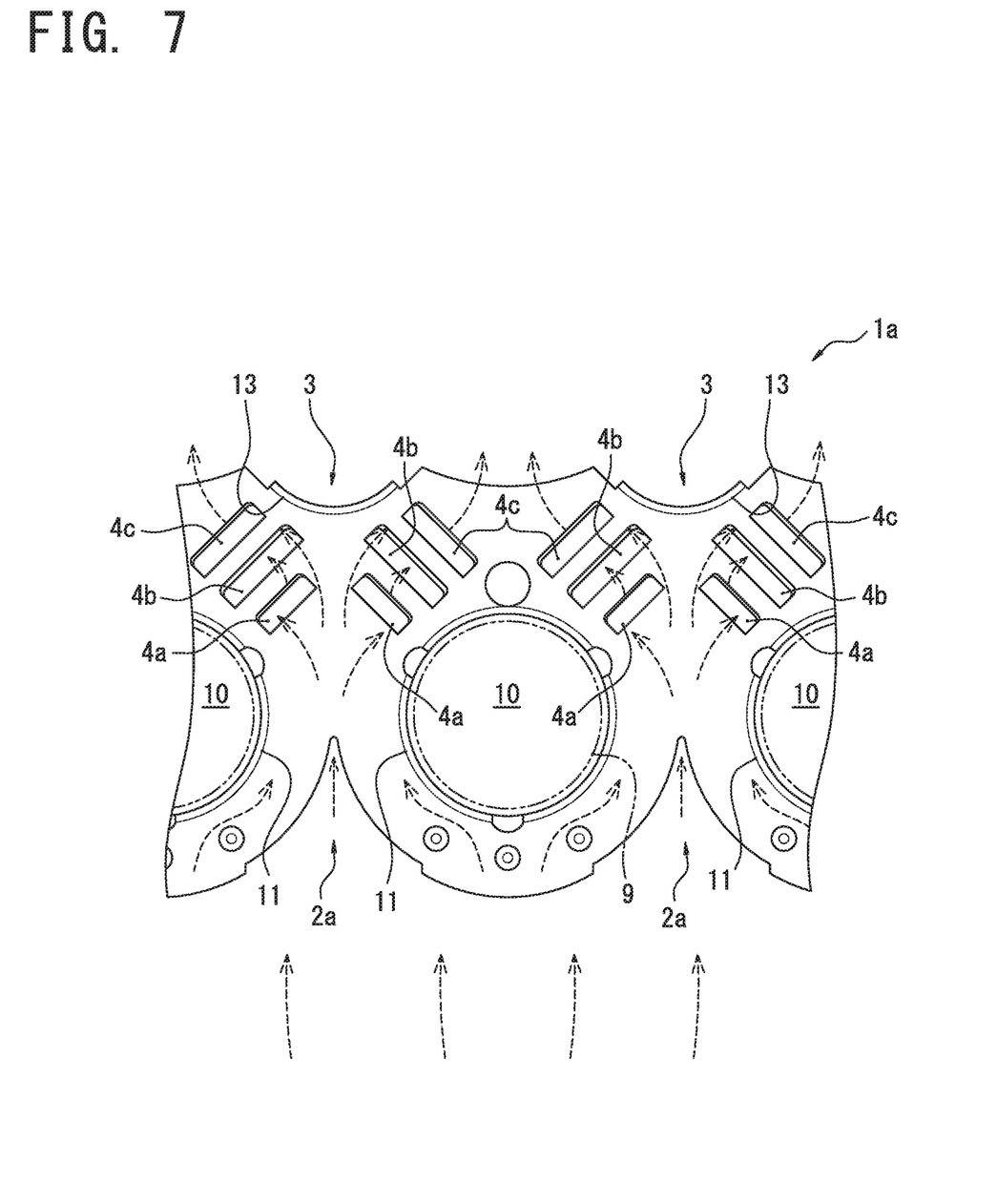
FIG. 7 is a schematic enlarged front view of a principal portion showing another example of a heat transfer fin according to the embodiment of the present invention.

FIG. 7 is a schematic enlarged front view of a principal portion showing another example of the heat transfer fin. This heat transfer fin 1a has the same configuration as the heat transfer fin 1, except that the second cut-and-raised portions 6a, 6b, 6c are not formed between the adjacent heat-transfer-tube insertion holes 10, and that upstream cut portions 2a are formed by deeply cutting the heat transfer fin 1a toward the downstream side from the fin lower end portion. Therefore, common elements are assigned the same reference numerals, and their explanations are omitted.

As shown in FIG. 7, the upstream cut portions 2a is formed in such a manner that a lower end of the upstream cut portion 2a is located downstream of an upstream end of the heat-transfer-tube insertion hole 10, and is located upstream of an upstream end of the most upstream first cut-and-raised portion 4a.

The upstream cut portions 2a thus make a distance between the heat-transfer-tube insertion hole 10 and an upstream edge of the heat transfer fin 1 substantially uniform in upstream and intermediate regions of the heat transfer fin 1a. Therefore, heat in the combustion exhaust gas uniformly transfers to the heat transfer fins 1a in the upstream and intermediate regions of the heat transfer fins 1a. This can achieve a lower temperature of the upstream edges of the heat transfer fins 1a to keep the heat transfer fins 1a from partially having high temperatures, and thus improvement of durability of the heat transfer fins 1a.

Other Embodiments (1) In the above embodiment, the water heater is used as the combustion apparatus. However, the combustion apparatus, such as a heat source device for a room heater, and a heat source device for a storage water heating system, may be used.

(2) In the above embodiment, the burner unit and the fan unit are disposed below the heat exchanger in such a manner that the combustion exhaust gas flows from the lower side to the upper side. However, the burner unit and the fan unit may be disposed above the heat exchanger in such a manner that the combustion exhaust gas flows from the upper side to the lower side. In such a case, vertical inverted heat transfer fins are disposed in the heat exchanger.

(3) In the above embodiment, the first and second protruding pieces are both formed in the substantially rectangular fin shape. However, these protruding pieces may have other shapes such as a substantially trapezoidal fin shape. The first and second protruding pieces are both formed to open upward, leftward, and rightward. However, these protruding pieces may have a so-called louver shape with its right and left ends closed.

(4) In the above embodiment, the adjacent two heat transfer tubes communicate with one another at their tube ends to form the heat exchange tube path. However, adjacent three or more heat transfer tubes may communicate with one another at their tube ends to form the heat exchange tube path.

(5) In the above embodiment, the first and second protruding pieces are both formed to protrude toward the downstream side. The first and second protruding pieces may be formed to protrude toward the upstream side. However, if these protruding pieces are formed to protrude toward the downstream side, eddy flow is likely to be formed when the combustion exhaust gas departs from these protruding pieces. Therefore, the turbulent flow of the combustion exhaust gas can be promoted.

(6) In the above embodiment, the plurality of heat transfer fins is arranged side by side in such a manner that the alignment direction of the plurality of heat transfer fins is consistent with the alignment direction of the plurality of gas burners. However, the plurality of heat transfer fins is arranged side by side in a state of rotating the heat transfer fins substantially 90 degrees in a horizontal direction in such a manner that the alignment direction of the plurality of heat transfer fins is substantially orthogonal to the alignment direction of the plurality of gas burners. Even in a case where the heat transfer tubes and the gas burners are disposed in the heat exchanger in such a position relation, repeated temperature rise and fall of a heat medium can be reduced, as compared with a heat exchanger in which a plurality of heat transfer tubes is arranged in a plurality of stages.

As described in detail, the present invention is summarized as follows.

According to the present invention, there is provided a heat transfer fin in a flat plate shape arranged in a heat exchanger through which combustion exhaust gas flows, the heat transfer fin comprising:

a plurality of heat-transfer-tube insertion holes aligned in a single stage;

a downstream cut portion provided downstream of a gas flow passage of the combustion exhaust gas between adjacent heat-transfer-tube insertion holes, and formed so as to be recessed toward an upstream side of the gas flow passage of the combustion exhaust gas;

a downstream flange formed on a peripheral edge of the downstream cut portion so as to protrude from one surface of the heat transfer fin; and a plurality of first protruding pieces formed between the heat-transfer-tube insertion hole and the downstream flange so as to protrude alternately from both surfaces of the heat transfer fin.

According to the heat transfer fin described above, a plurality of heat transfer tubes is aligned in the single stage. Therefore, even in a case where partial combustion in a burner unit is performed, repeated temperature rise and fall of a heat medium flowing in a heat exchange tube path can be reduced.

On the other hand, when the heat transfer tubes are aligned in the single stage, no heat transfer tube is located on the downstream side of the gas flow passage of the combustion exhaust gas between adjacent heat transfer tubes. Therefore, the combustion exhaust gas linearly flows between the adjacent heat transfer tubes to the downstream side, which results in decreasing contact time of the combustion exhaust gas with the heat transfer tubes and reducing the opportunity for the combustion exhaust to contact the heat transfer tubes between adjacent heat transfer fins. Therefore, turbulent flow of the combustion exhaust gas is not promoted between the adjacent heat transfer fins, and a temperature boundary layer of the combustion exhaust gas is likely to be formed on each surface of the heat transfer fin.

However, according to the heat transfer fin described above, the downstream cut portion is provided downstream of the gas flow passage of the combustion exhaust gas between the adjacent heat-transfer-tube insertion holes so as to be recessed toward the upstream side of the gas flow passage of the combustion exhaust gas, and the downstream flange is formed on the peripheral edge of the downstream cut portion so as to protrude from the one surface of the heat transfer fin. Thus, the combustion exhaust gas passing between the adjacent heat-transfer-tube insertion holes collides with the downstream flange. Then, a flow direction of the gas flow passage of the combustion exhaust gas is deflected by the downstream flange in such a manner that the combustion exhaust gas flows between the heat-transfer-tube insertion hole and the downstream flange. As a result, the gas flow passage of the combustion exhaust gas is formed to wrap around the heat transfer tubes in a downstream region of the heat transfer fin. This can achieve not only reduction in combustion exhaust gas flowing by a shortcut from a gap between the adjacent heat transfer tubes to the downstream side, but also longer contact time of the combustion exhaust gas with the heat transfer tubes.

Further, according to the heat transfer fin described above, the plurality of first protruding pieces is formed between the heat-transfer-tube insertion hole and the downstream flange so as to protrude alternately from both the surfaces of the heat transfer fin. Thus, the combustion exhaust gas collides with the first protruding pieces. This allows heat in the combustion exhaust gas to directly transfer to the first cut-and-raised pieces. Further, when the combustion exhaust gas colliding with the first cut-and-raised pieces passes tip ends of the first cut-and-raised pieces, eddy flow is formed and turbulent flow of the combustion exhaust gas is promoted. This can achieve a breakup of a temperature boundary layer of the combustion exhaust gas flowing on the heat transfer fin.

Preferably, the heat transfer fin described above further comprises a plurality of second protruding pieces formed between the adjacent heat-transfer-tube insertion holes so as to protrude alternately from both the surfaces of the heat transfer fin.

According to the heat transfer fin described above, the plurality of second protruding pieces is formed between the adjacent heat-transfer-tube insertion holes so as to protrude alternately from both the surfaces of the heat transfer fin. Thus, the combustion exhaust gas collides with the second protruding pieces. This allows heat in the combustion exhaust gas to directly transfer to the second cut-and-raised pieces. Further, when the combustion exhaust gas colliding with the second cut-and-raised pieces passes tip ends of the second cut-and-raised pieces, eddy flow is formed and turbulent flow of the combustion exhaust gas is promoted. This can achieve a breakup of a temperature boundary layer of the combustion exhaust gas flowing on the heat transfer fin.

Preferably, in the heat transfer fin described above, the first protruding pieces protrude so as to be substantially orthogonal to the gas flow passage of the combustion exhaust gas flowing from the upstream side to a downstream side between the heat-transfer-tube insertion hole and the downstream flange, and the second protruding pieces protrude so as to be substantially orthogonal to the gas flow passage of the combustion exhaust gas flowing from the upstream side to the downstream side between the adjacent heat-transfer-tube insertion holes.

According to the heat transfer fin described above, the heat in the combustion exhaust gas efficiently transfers to the first protruding pieces and the second protruding pieces. The turbulent flow of the combustion exhaust gas can be further promoted.

Preferably, in the heat transfer fin described above, the first protruding piece and the second protruding piece have, respectively, a first cut-and-raised portion and a second cut-and-raised portion each formed by cutting and raising a part of the heat transfer fin, and the downstream flange has a protrusion height higher than protrusion heights of the first cut-and-raised portion and the second cut-and-raised portion on one surface side of the heat transfer fin.

According to the heat transfer fin described above, the first protruding piece and the second protruding piece have, respectively, a first cut-and-raised portion and a second cut-and-raised portion each formed by cutting and raising a part of the heat transfer fin. Therefore, a part of the combustion exhaust gas flows from the upstream side to the downstream side while meandering on both surface sides of the heat transfer fin via slits formed by the first cut-and-raised portions and the second cut-and-raised portions. Thus, repeated mixing and separation of the combustion exhaust gas flowing through the clearance between the adjacent heat transfer fins promotes the turbulent flow of the combustion exhaust gas in the downstream region and an intermediate region of the heat transfer fin. Additionally, when the combustion exhaust gas passes through the slits, collision of the combustion exhaust gas with opening edges of the slits further promotes the turbulent flow of the combustion exhaust gas. This can achieve the breakup of the temperature boundary layer of the combustion exhaust gas flowing on the heat transfer fin.

Further, according to the heat transfer fin described above, since the first cut-and-raised portion and the second cut-and-raised portion have protrusion heights lower than that of the downstream flange, the clearance between the adjacent heat transfer fins is not closed by the first cut-and-raised portion and the second cut-and-raised portion. This can suppress excessive increase in passing resistance of the combustion exhaust gas.

Preferably, the heat transfer fin described above further comprises an upstream protrusion formed between the heat-transfer-tube insertion hole and an upstream edge of the heat transfer fin so as to protrude from the one surface of the heat transfer fin.

According to the heat transfer fin described above, since the upstream protrusion is formed between the heat-transfer-tube insertion hole and an upstream edge of the heat transfer fin so as to protrude from the one surface of the heat transfer fin, the surface area in the upstream region in contact with high temperature combustion exhaust gas can be increased. This can achieve longer contact time of the combustion exhaust gas with the heat transfer fin. Further, since the upstream protrusion protrudes from the one surface of the heat transfer fin, the combustion exhaust gas flowing from the upstream side can be split into split gas components by the upstream protrusion. This allows the combustion exhaust gas to come into contact with the heat transfer tubes uniformly. Further, the turbulent flow of the combustion exhaust gas can be promoted in the upstream region of the heat transfer fin. This can achieve the breakup of the temperature boundary layer of the combustion exhaust gas flowing on the heat transfer fin.

Preferably, the heat transfer fin described above further comprises an upstream cut portion provided upstream of the gas flow passage of the combustion exhaust gas between the adjacent the heat-transfer-tube insertion holes, and formed so as to be recessed toward the downstream side of the gas flow passage of the combustion exhaust gas.

According to the heat transfer fin described above, the upstream cut portion is provided upstream of the gas flow passage of the combustion exhaust gas between the adjacent the heat-transfer-tube insertion holes, and formed so as to be recessed toward the downstream side of the gas flow passage of the combustion exhaust gas. Therefore, a distance between the heat-transfer-tube insertion hole and an upstream edge of the heat transfer fin can be formed substantially uniform in the upstream region of the heat transfer fin. Thus, the heat in the combustion exhaust gas can be uniformly transferred to the heat transfer fin in the upstream region. This can achieve a lower temperature of the upstream edges of the heat transfer fins to keep the heat transfer fins from partially having high temperatures, and thus improvement of durability of the heat transfer fin.

According to the present invention, there is provided the combustion apparatus which is capable of efficiently heating the heat medium flowing in the heat transfer tubes by heat exchange with the combustion exhaust gas.

The present application claims a priority based on Japanese Patent Applications No. 2018-194605 filed on Oct. 15, 2018 and No. 2018-236249 filed on Dec. 18, 2018, the contents of which are hereby incorporated by reference in its entirely.

Although the present invention has been described in detail, the foregoing descriptions are merely exemplary at all aspects, and do not limit the present invention thereto. It should be understood that an enormous number of unillustrated modifications may be assumed without departing from the scope of the present invention.

What is claimed is:

1. A heat transfer fin having a flat plate shape and arranged in a heat exchanger through which combustion exhaust gas flows, the heat transfer fin comprising:
   a plurality of heat-transfer-tube insertion holes aligned in a single stage;
   a downstream cut portion provided downstream of a gas flow passage of the combustion exhaust gas between an adjacent pair of the plurality of heat-transfer-tube insertion holes, the downstream cut portion being formed so as to be recessed toward an upstream side of the gas flow passage of the combustion exhaust gas;
   a downstream flange formed on a peripheral edge of the downstream cut portion so as to protrude from a first surface of the heat transfer fin; and
   a plurality of protruding pieces formed between the downstream flange and a first heat-transfer-tube insertion hole of the adjacent pair of the plurality of heat-transfer-tube insertion holes located adjacent to the downstream flange so as to protrude alternately from the first surface and a second surface of the heat transfer fin,
   wherein each of the plurality of protruding pieces is a cut-and-raised portion protruding only in a downstream direction of the gas flow passage of the combustion exhaust gas.

2. The heat transfer fin according to claim 1, wherein the plurality of protruding pieces is a plurality of first protruding pieces, the heat transfer fin further comprising a plurality of second protruding pieces formed between the adjacent pair of the plurality of heat-transfer-tube insertion holes so as to protrude alternately from the first surface and the second surface of the heat transfer fin.

3. The heat transfer fin according to claim 2,
   wherein the plurality of first protruding pieces are configured to be substantially orthogonal to the gas flow passage of the combustion exhaust gas flowing from the upstream side to a downstream side between the first heat-transfer-tube insertion hole of the adjacent pair of the plurality of heat-transfer-tube insertion holes and the downstream flange, and
   wherein the plurality of second protruding pieces are configured to be substantially orthogonal to the gas flow passage of the combustion exhaust gas flowing from the upstream side to the downstream side between the adjacent pair of the plurality of heat-transfer-tube insertion holes.

4. The heat transfer fin according to claim 2,
   wherein each of the plurality of first protruding pieces is a first cut-and-raised portion,
   wherein each of the plurality of second protruding pieces is a second cut-and-raised portion protruding only in a downstream direction of the gas flow passage of the combustion exhaust gas, and
   wherein the downstream flange has a protrusion height greater than protrusion heights of the first cut-and-raised portions and the second cut-and-raised portions protruding from the first surface of the heat transfer fin.

5. The heat transfer fin according to claim 1, further comprising an upstream protrusion formed between the first heat-transfer-tube insertion hole of the adjacent pair of the plurality of heat-transfer-tube insertion holes and an upstream edge of the heat transfer fin so as to protrude from the first surface of the heat transfer fin.

6. The heat transfer fin according to claim 1, further comprising an upstream cut portion upstream of the gas flow passage of the combustion exhaust gas between the adjacent pair of the plurality of heat-transfer-tube insertion holes, the upstream cut portion being formed so as to be recessed toward a downstream side of the gas flow passage of the combustion exhaust gas.

* * * * *